United States Patent Office 3,431,798
Patented Mar. 11, 1969

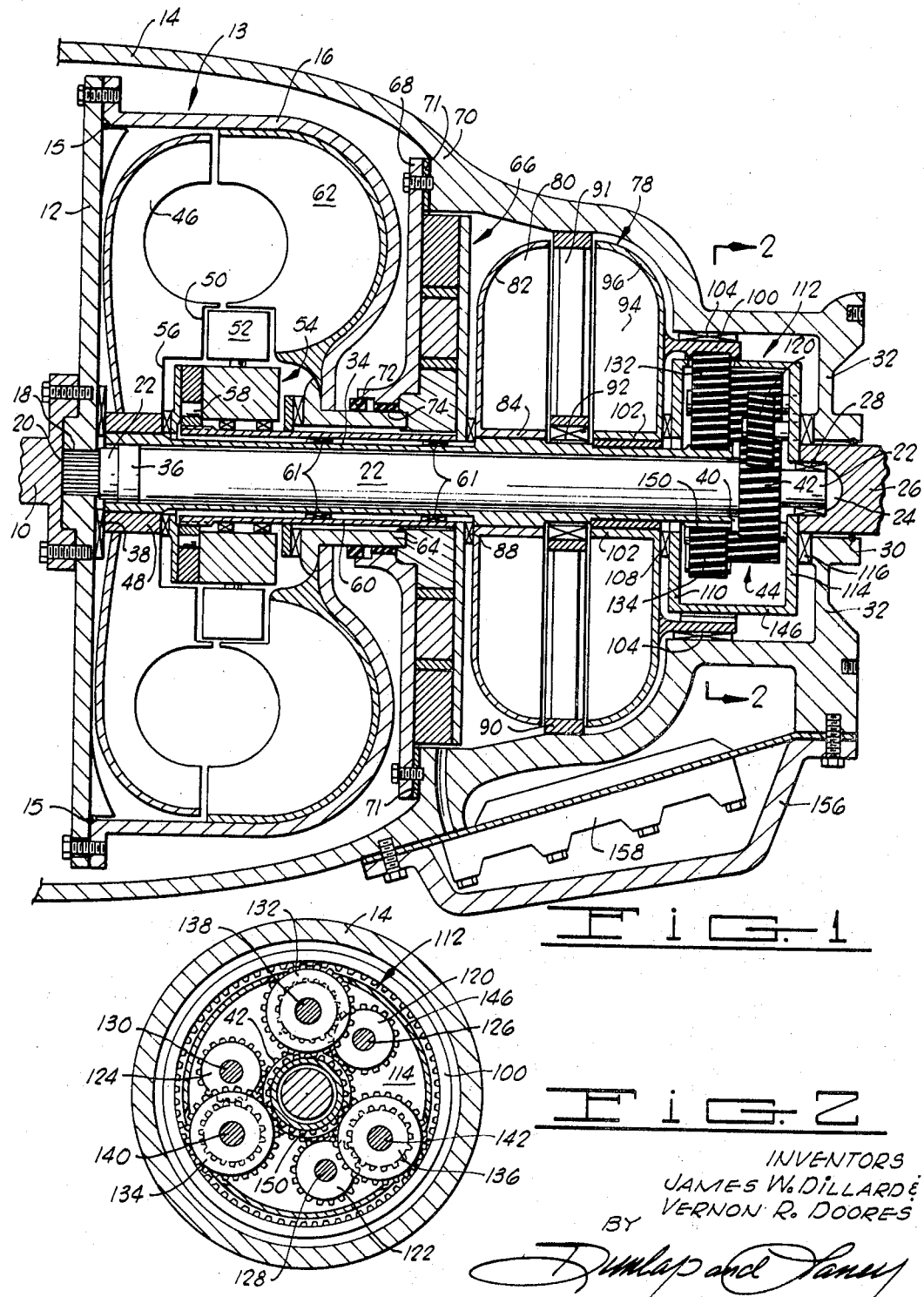

3,431,798
AUTOMATIC TRANSMISSION SYSTEM
James W. Dillard, 346 S. Oak, Ponca City, Okla. 74601,
and Vernon R. Doores, 1578 E. Snider, Springfield,
Mo. 65803
Filed Oct. 18, 1967, Ser. No. 676,182
U.S. Cl. 74—688
Int. Cl. F16h 47/08
8 Claims

ABSTRACT OF THE DISCLOSURE

An automatic transmission system including a forward drive fluid coupling, a reverse drive fluid coupling, a gear pump for supplying fluid to the fluid couplings, a valve device for selectively controlling the direction of fluid by the pump to the couplings, and a planetary gear system. Each fluid coupling includes a pair of opposed radial vane-containing tori. In the forward drive coupling, one torus is connected to, and driven by, the crankshaft from the engine. The other torus of the forward drive coupling is connected to the engine crankshaft through the planetary gear system, the planet carrier of which is connected to a driven shaft adapted to be connected through the automobile differential to the ground engaging wheels. Both tori of the reverse drive fluid coupling are connected to the engine crankshaft through different parts of the planetary gear system. In each fluid coupling, the two tori are made to rotate in opposite directions from each other when the coupling is substantially empty of fluid and the planet carrier is held stationary.

Background of the invention

*Field of the invention.*—This invention relates to hydraulic transmission systems in which power is transmitted from a drive shaft through a torus, hydraulic torque converter or fluid turbine in combination with a planetary gear system.

Brief description of the prior art

For the past two decades, the uses of hydraulic torque converter systems for automobiles has rapidly increased until, at the present time, many more automobiles are equipped with automatic or fluid drive transmissions in which fluid couplings are employed than with standard transmissions in which the ratio between the engine r.p.m. and the r.p.m. of the driven ground-engaging wheels of the automobiles is manually changed. Automatic or hydraulic torque converter transmission systems, however, continue to be an expensive, luxury accessory on automobiles, and the complexity of this portion of the transmission system is such that repair and maintenance of an automatic transmission system is both expensive and time consuming. The automatic transmission systems which are presently in use for the majority of the standard sized automobiles include several clutches, cones and brake bands, each of which can relatively easily get out of adjustment under a reasonable amount of abusive use of the automobile, thus requiring repair of the damaged transmission system. Loss of hydraulic transmission fluid is particularly apt to severely damage these clutches and brake bands so as to require their complete replacement in many instances and extensive overhaul of the transmission system. The relatively inaccessible location of these elements renders repair of the damaged transmission system rather expensive and, in the long run, severely reduces the effective service life of the transmission.

Brief description of the invention

The present invention provides an improved automatic transmission system employing a pair of novel fluid coupling assemblies in a combination with a planetary gearing system. The conventional clutches, brake bands, sprags and cones are eliminated so that the transmission system is less susceptible to malfunctioning and maintenance cost is greatly reduced. The change of r.p.m. ratio from the motor to the driven wheels is continuously variable so that no sensible shifting occurs and a smoother ride is delivered.

The present invention includes the usual crankshaft from the engine, which will hereinafter be termed the drive shaft. The shaft extending from the automatic transmission toward the differential at the rear of the automobile will be termed the driven shaft. The automatic transmission interposed between the drive shaft and the driven shaft includes a planetary gear system in which the planet carrier is rigidly connected to the driven shaft, and a sun gear is carried by a shaft directly driven by the drive shaft. For then selectively controlling the movements of the driven shaft relative to the drive shaft, a pair of fluid couplings are provided, each of which includes a pair of opposed or facing radial vane-containing tori.

One of these couplings may be termed a forward drive fluid coupling, and one of its tori is driven directly from the drive shaft and the other is coupled to the planetary gear system so as to rotate in the opposite direction from the directly driven torus when the coupling is empty of fluid and the planet carrier is held stationary. The other fluid coupling is termed the reverse drive coupling and both of its tori are coupled to the planetary gear system and are driven in opposite directions when the coupling is substantially empty of fluid and the planet carrier is held stationary.

A conventional gear pump of the type now used in automatic fluid transmission systems is used to supply fluid to the fluid couplings at selected times in response to a conventional selector valve which is shifted by the usual manual selector lever and foot feed control available to the vehicle operator. A variable vane stator device is preferably cooperatively disposed in relation to the tori of the forward drive fluid coupling, and by a selectively controlled variation in the pitch of its vanes, can be used to vary the torque conversion effected in this fluid coupling.

The described transmission system permits a major objective of the invention to be achieved in simplifying the transmission system to eliminate the usual clutches, brake bands, sprags, cones and internal pistons.

Another important object of the invention is to provide an automatic transmission system wherein loss of the transmission fluid through leakage or the like does not result in any damage to the transmission.

An additional object of the invention is to provide an automatic transmission system which makes a smooth, imperceptible transition from starting speed to high speed.

Yet another object of the invention is to provide an improved transmission system in which all of the usual transmission statuses, including parking, neutral, driving, low, reverse and grade retard are available to the vehicle operator.

Another object of the invention is to provide an automatic transmission system which is relatively easy to maintain and repair and is characterized in having a long and relatively trouble-free operating life.

In addition to the foregoing objects and advantages, additional objects and advantages will become apparent as the following detailed description of the invention is read in conjunction with the accompanying drawings which illustrate the invention.

Brief description of the drawings

FIGURE 1 is a longitudinal sectional view through the center of a transmission system constructed in accordance with the invention.

FIGURE 2 is a sectional view taken along line 2—2 of FIGURE 1 illustrating the arrangement of the planetary gearing used in the transmission system.

*Brief description of a preferred embodiment of the invention*

In referring to the drawings, reference numerals having arrowheads are utilized to identify structural combinations which include a plurality of subcombinations or individual structural elements. Reference numerals having plain lead lines will be employed to designate individual elements of the structure.

In FIGURE 1 of the drawings, a longitudinal sectional view through the automatic transmission system of the present invention is illustrated. A drive shaft 10 which is directly driven in rotation by the engine of the automobile is connected at its end opposite the end connected to the engine to an annular disc or flywheel 12 which forms the front wall of the housing 13 of what will hereinafter be termed the forward drive fluid coupling. This coupling housing 13 is positioned within a transmission housing 14 of conventional construction. A suitable O-ring seal 15 is provided for preventing leakage from the housing 13 into the transmission housing 14. The remainder of the forward drive fluid coupling housing 13 is formed by the housing element 16 which is bolted at its forward end to the flywheel 12 and has an integral extension at its other end which curves inwardly in an arcuate path. The flywheel 12 to which the drive shaft 10 is connected is provided with a grooved socket 18 in the center thereof for receiving a splined end 20 of an internal shaft 22. The internal shaft 22 thus turns with the flywheel 12 when the latter is driven in rotation by the drive shaft 10. The opposite end of the internal shaft 22 is journaled in a recess 24 formed in the end of a driven shaft 26 using suitable bearings 28. The driven shaft 26 extends through a suitable universal joint (not shown) to the differential gearing (not shown) located at the rear of the automobile in accordance with conventional construction. A suitable seal is provided between the driven shaft 26 and an inwardly extending flange 32 of the transmission housing 14.

An external, hollow shaft 34 which is shorter than the internal shaft 22 concentrically surrounds the internal shaft and is rotatably supported thereon by suitable bushings 36. Thrust bearings 38 and 40 located at the front and rear ends, respectively, of the external shaft 34 space this shaft from the flywheel 12 and from a sun gear 42 which is splined on the rear end portion of the internal shaft 22, and forms a portion of a planetary gear system, designated generally by reference numeral 44.

The forward drive fluid coupling includes a plurality of driven radial vanes 46 forming a rearwardly facing torus positioned just to the rear of the flywheel 12. The radial vanes 46 are each concavely dished along its rearward edge, and each is secured at its radially inner edge to a sleeve 48 which is splined on the external shaft 34. The vanes 46 thus turn with the external shaft 34. It will be noted that the vanes 46 are each cut away as shown at 50 to accommodate the blades 52 of a variable vane stator designated generally by reference numeral 54. The vanes 46 are further cut away as shown at 56 to accommodate a portion of the stator 54 and a sprag or one-way clutch 58 which mounts the stator on the exterior of a hollow pump shaft 60 through a suitable spline. The hollow pump shaft 60 forms a part of a gear pump, hereinafter described, and is journaled around external shaft 34 by suitable bushings 61. The sprag 58 functions to prevent the stator 54 from rotating in the opposite direction from the direction of rotation of the radial vanes 62, next to be described, while permitting co-directional rotation with these vanes.

The forward drive fluid coupling also includes a second set of radial vanes 62, hereinafter termed drive vanes, which face forwardly and are disposed opposite the driven vanes. The radial vanes 62 are secured at their outer peripheral edges by welding or other suitable means to the housing element 16, and are concavely configured at their inner edge and are cut away similarly to the radial vanes 46 to accommodate the vanes 52 of the variable pitch stator 54. The radially inner edge of the housing element 16 is secured to a sleeve 64 which is drivingly connected to the rotor of a gear pump 66 of conventional construction of the type now used in automatic transmission systems. The pump 66 is somewhat schematically illustrated, but its construction is well understood by those skilled in the art, and further details concerning both its structure and operation can be obtained by referring, for example, to 1966 service manuals for Turboglide and Powerglide transmission systems as promulgated by the General Motors Company of Flint, Mich.

The gear pump 66, except for the hollow pump shaft 60 which extends forwardly therefrom, is isolated from the housing containing the forward drive fluid coupling by a partition plate 68 which is bolted to a shoulder 70 formed on the inside of the transmission housing 14, and extends radially inwardly to a point adjacent the sleeve 64. A suitable gasket 71 forms a seal between the partition plate 68 and the shoulder 70. A suitable seal 72 and bushing 74 are provided between the sleeve 64 and the partition plate 68.

A reverse drive fluid coupling is located in the rear part of the transmission housing 14 and to the rear of the gear pump 66. The reverse drive fluid coupling, which is designated generally by reference numeral 78, includes a set of rearwardly facing, radially extending vanes 80 mounted in an enclosing shell or cover plate 82 and welded or otherwise suitably secured at their radially inner edges to a sleeve 84 which is splined on the external shaft 34. The vanes 80, which with their cover plate 82, form a forward torus of the reverse drive fluid coupling 78, are separated from the gear pump 66 by means of a suitable thrust bearing 88.

A stationary fluid director plate 90 is positioned immediately to the rear of the radial vanes 80, and in parallelism therewith, and is secured at its outer periphery to the internal wall of the transmission housing 14. The fluid director plate 90 is centrally apertured to pass the external shaft and internal shaft, 34 and 22, respectively, and a suitable bearing element 92 is interposed between the fluid director plate 90 and the external shaft 34. The fluid director plate 90 is provided with a plurality of fluid directing vanes 91 which are angled with respect to the radial vanes 80 and serve to effect fluid coupling between the radial vanes 80 and a set of forwardly facing radial vanes 94 provided in an after or rear torus forming a second major subassembly of the reverse drive fluid coupling 78.

The radial vanes 94 are secured at their outer peripheral edges to an arcuate cover plate or shell 96 which is of annular configuration and which is secured to a ring gear sleeve 100 having teeth on its inner periphery and forming a ring gear for a purpose hereinafter described. The inner peripheral edge of each of the radial vanes 94 is secured to a sleeve 102 which surrounds a bushing splined on the external shaft 34 and turning with said shaft during the operation of the automatic transmission system. A suitable bushing 104 is provided between the exterior of the ring gear 100 and the internal wall of the transmission housing 14. A thrust bearing 108 is positioned between the cover plate 96 and the forward wall 110 of a planet carrier designated generally by reference numeral 112. The planet carrier 112 is welded or in any suitable way secured at a rear wall 114 thereof to the forward end of the driven shaft 26. Suitable thrust bearings 116 are positioned between the rear wall 114 of the planet carrier 112 and an inwardly projecting flange 32 of the transmission housing 14.

Mounted within the planet carrier 112 are a plurality of planet gears which may be identified as a set of inner planet gears and a set of outer planet gears. The set of inner planet gears includes three relatively small idler planet gears 120, 122 and 124 which are mounted on stub shafts 126, 128 and 130, respectively, journaled in the rear wall 114 of the planet carrier 112. The planet gears 120, 122 and 124 carry peripherally disposed teeth which mesh with the teeth carried by the sun gear 42 which is splined on the internal shaft 22. The outer set of planet gears includes the planet gears 132, 134 and 136 which are mounted on shafts 138, 140 and 142 extending through the planet carrier and journaled in the front and rear walls 110 and 114, respectively, thereof. It will be noted that each of the external planet gears 132, 134 and 136 is a compound gear having a relatively large forward section carrying teeth at the outer periphery thereof, and having a rear section of a lesser diameter formed integrally with the forward section and also carrying teeth at the outer periphery thereof. The rear sections of the outer planet gears 132, 134 and 136 are dimensioned to mesh with, and be driven by, the inner planet gears 120, 122 and 124, respectively.

The outer peripheral wall 146 of the planet carrier 112 is slotted or apertured opposite the enlarged forward portions of the outer planet gears 132, 134 and 136 so that the teeth carried on the outer peripheries of these forward portions project through the apertures or slots provided in the outer peripheral wall of the planet carrier 112. This arrangement is best depicted in FIGURE 2. The teeth carried on the large forward portion of the outer planet gears 132, 134 and 136 thus engage the internal teeth of the ring gear 100 so that the ring gear can be driven in rotation from the outer planet gears. The teeth carried on the enlarged forward portion of each of the planet gears 132, 134 and 136 also mesh with teeth carried on a sun gear 150 which is splined on the external shaft 34 and positioned immediately forward of the sun gear 42 of the internal shaft 22. The thrust bearing 40 separates the sun gear 150 and the external shaft 34 from the sun gear keyed to the internal shaft 22.

On the lower side of the transmission housing 14, an oil pan or sump 156 is secured to the housing and communicates with the forward drive fluid coupling and the reverse drive coupling to receive fluid therefrom at certain times during the operation of the transmission assembly as hereinafter described. The oil pan or sump 156 accommodates a conventional valve body 158 which is secured to the transmission housing 14 and communicates through suitable conduits with the gear pump 66. The valve body 158 contains movable valve members connected to, and actuated by, a manual gear shift lever (not shown) provided as a part of conventional automatic transmission systems for the purpose of placing the transmission system in forward drive or in reverse drive or in low, park or neutral. The valve body also contains a passing gear valve connected to, and operated by, the foot feed or accelerator in the automobile for transferring throttle pressure from the oil pan or sump 156 via the pump to the variable vane stator at certain times during the operation of a vehicle containing the transmission, as more specifically hereinafter described.

*Operation*

When an automobile containing the transmission of the present invention is initially started in neutral gear or in park, the engine drives the drive shaft in rotation, which in turn drives the flywheel 12 and the internal shaft 22 which is splined in the flywheel. As the internal shaft 22 rotates, say clockwise, the sun gear 42 splined thereon is likewise rotated clockwise and the torus constituted by the radial vanes 62 is rotated in the same direction. Due to the engagement of the wheels of the automobile with the ground, and due to the absence of hydraulic fluid from the forward and reverse drive couplings, as will be more fully hereinafter explained, the driven shaft does not rotate and the planet carrier 112 remains stationary.

With the planet carrier held against rotation, the sun gear 42 drives the inner planet gears 120, 122 and 124 in a counterclockwise direction, and these in turn drive the outer planet gears 132, 134 and 136 in a clockwise direction. Movement of the outer planet gears 132, 134 and 136 in a clockwise direction drives the ring gear 100 and the torus containing the radial vanes 94 of the reverse drive fluid coupling in a clockwise direction. Due to the engagement of the external shaft 34 through the sun gear 150 with the planet gears 132, 134 and 136, this shaft is also driven in a counterclockwise direction, carrying with it the torus containing the rearwardly facing radial vanes 46 of the forward drive fluid coupling, and the torus containing the rearwardly facing radial vanes 80 of the reverse drive fluid coupling. It will thus be noted that the two tori of the forward drive fluid coupling are turning in opposite directions, as are those of the reverse drive fluid coupling.

With the manual gear shift lever of the automobile in the neutral position as described, the gear pump 66 is driven by the drive shaft 10 through the flywheel 12, the housing section 16 and the sleeve 64. At this time, the manual selector valve located in the valve body has been shifted so that the pump merely recirculates hydraulic fluid through the valve body to the oil pan, and no hydraulic fluid is delivered by the pump to the chambers containing either the forward drive fluid coupling or the reverse drive fluid coupling. The drive to all moving units is thus a direct drive through the planetary gearing, and the radial vanes 94 in the forwardly facing torus of the reverse drive coupling rotate slower than do the vanes 62 of the forwardly facing torus in the forward drive coupling due to the ratio of gearing.

It should also be noted that at this time, the vanes 52 of the variable pitch stator unit 54 extend substantially normal to the axis of the internal and external shafts 22 and 34. This is a status in which the vanes 52 are extending at an angle of 90° to the position in which they are illustrated in FIGURE 1 of the drawings. The pivotation of the vanes 52 about their respective axes to alter their pitch, and thus to vary the extent to which fluid coupling occurs between the radial vanes 46 and 62, is accomplished at certain times during operation of the transmission by the direction of transmission power fluid under pressure from the gear pump 66 through the hollow pump shaft 60 to the interior of the stator. Here the pressurized fluid acts upon two oppositely disposed pistons (not shown) to move the pistons apart from each other and effect a corresponding rotation of the vanes 52. The construction and general method of operation of the variable vane stator 54 are well understood in the art, and this unit of the transmission assembly of the present invention is a commercially available item. The manner in which it functions is the specific overall operation of the present invention will be described in greater detail hereinafter.

When the manual selector lever is shifted by the vehicle operator into the "drive" range status, the proper selector valve in the valve body 158 is shifted so that fluid is pumped by the pump 66 into the forward drive fluid coupling, and this coupling becomes filled with the transmission fluid. At this time, the torus containing the forwardly facing radial vanes 62 is turning in a clockwise direction at the same speed as the engine, since it is directly coupled to the drive or crankshaft 10. The torus containing the rearwardly facing radial vanes 46 is turning in a counterclockwise direction due to the retention of the planet carrier 112 against rotation and the arrangement of the planetary gear assembly. As the fluid couples the two tori in the forward drive fluid coupling, however, the torus containing the rearwardly facing vanes 46 is gradually slowed down as the coupling effect is increased by the introduction of additional fluid under greater pressure to the housing 16.

Ultimately the torus containing the rearwardly facing vanes 46 is caused to stop and then commence to turn in the same clockwise direction as the opposing torus containing the forwardly facing radial vanes 62. The transition from counterclockwise movement to clockwise movement by the torus containing the rearwardly facing radial vanes 46 is smooth and is generally imperceptible to the vehicle operator. The slightest decrease in the counterclockwise rotational movement of this torus results in torque being imposed upon the planet carrier 112 through the planetary gear system and as the coupling effect increases, the torque becomes sufficient to move the ground engaging wheels of the automobile due to the forced rotation of the planet carrier which is directly connected to the driven shaft 26. In a preferred embodiment of the invention, the gear ratios in the planetary gearing are such that the range of r.p.m. ratio of the directly driven torus containing the vanes 62 to the companion torus containing the vanes 46 is from 3.69 to 1 to 1 to 1, from the lowest to the highest vehicle speed.

It should be noted at this point that during normal driving or cruising speeds, the variable pitch vanes 52 of the stator 54 are in their closed position, or are at least partially closed. In the event it is desired to develop a burst of power for passing another vehicle, however, the accelerator may be rapidly depressed or pushed to the floorboard to open a conventional throttle valve (not seen) in the valve body 158. This causes the gear pump 66 to deliver fluid through the hollow pump shaft 60 to the interior of the stator 54. The fluid expands the opposed pistons contained in the stator to move the vanes 52 of the stator to the fully open position depicted in FIGURE 1 of the drawings. This opening of the stator vanes effectively directs transmission fluid from the outer portion of the forward drive fluid coupling into the center thereof and permits the fluid coupling to function as a torque converter, and to achieve the equivalent of downshifting the transmission to a second gear in which more power is transmitted from the engine to the rear wheels of the vehicle.

The variable vane stator 54 also functions in the operation of the automatic transmission of the invention at a time when the operator desires to operate the vehicle in the manual low range to achieve maximum power transmission to the wheels. Movement of the manual selector lever to the manual low range by the vehicle operator opens a port of the valves contained in the valve body 158 so that the gear pump 66 directs transmission fluid to the interior of the stator 54, pivoting the vanes 52 to their open status as hereinbefore described. The opposed tori containing the radial vanes 62 and 46 then again function in a pure torque converter status, and maximum torque at low r.p.m. is transmitted to the ground engaging wheels. It will be understood, of course, that the arrangement of porting and valve actuation within the valve body 158 is such that the fluid pressure developed in each of the fluid couplings by the gear pump 66 is varied to correspond to the type of driving desired. In other words, the fluid pressure in the forward drive fluid coupling is substantially different when the manual selector lever has been placed in the manual low range position than is the case when the manual selector lever is placed in the drive range. Thus, a different effect in terms of speed of the vehicle is obtained, even though in either situation, the variable vane stator 54 may be actuated to fully open the vanes 52.

When it is desired to drive the automobile in reverse, the manual selector lever is placed in the reverse position and this effectively results in transmission fluid being pumped by the gear pump 66 into the reverse drive fluid coupling which includes the opposed tori containing the radial vanes 80 and 94. The forward drive fluid coupling is, at this time, drained of transmission fluid via the valve body 158 so that it returns to the same status which it occupies when the selector lever is in the neutral position.

With the filling of the reverse drive fluid coupling with transmission fluid, the rearward torus thereof containing the forwardly facing radial vanes 94 is slowed or decelerated in its free clockwise rotational movement undergone when no fluid is present. The "drag" on this torus is due to fluid coupling through fluid director plate 90 to the driven torus containing the rearwardly facing radial vanes 80. It will be recalled that the torus containing radial vanes 80 is driven through the planetary gear system in a counterclockwise direction. When the reverse drive coupling is filled with transmission fluid, the fluid acts on the rearward torus to slow this torus and eventually stop it from further rotation. With the slowing of the rearward torus, the planet carrier 112 is forced to move in counterclockwise rotation, and this in turn drives the driven shaft 26 in the same direction (counterclockwise) so that the automobile moves in reverse.

A final status which may be achieved with the automatic transmission system of the present invention is a grade retard status. By moving the manual selector lever to this position, the operator shifts the valving within the valve body 158 so that the pump 66 directs the transmission fluid into both the forward drive and the reverse drive fluid couplings simultaneously. The effect of filling both couplings with transmission fluid while the engine is running is that the planet carrier 112 tends to be locked against rotation in either direction, and the automobile is therefore retained in its motion to an extent dependent upon the speed at which the engine is driven and the gear pump 66 is rotated.

From the foregoing description of the invention, it will have become apparent that the present invention provides a simple, mechanically sturdy, automatic transmission system which is versatile in its operation, and which, due to the elimination of the friction materials associated with such usually included elements as clutches, bands, and cones, avoids the development of foreign materials in the transmission fluid, and the need to replace these expensive and inaccessible parts at such time as repair or overhaul of the transmission is desirable.

Although certain preferred embodiments of the invention have been herein described in order to provide a clear example to those skilled in the art of how the invention may be practiced, it will be understood that various changes and modifications to certain structural elements in the transmission system of the invention can be effected without departure from the basic principles which underlie the invention. Changes and innovations of this type which continue to rely upon the basic principles of the invention are deemed to be circumscribed by the spirit and scope of the invention except as the same may be necessarily limited by the appended claims or reasonable equivalents thereof.

What is claimed is:
1. An automatic transmission system comprising:
   a drive shaft adapted to be connected to a prime mover;
   a driven shaft;
   an internal shaft drivingly connected at one of its ends to said drive shaft for codirectional rotation with said drive shaft;
   a first sun gear keyed to said internal shaft for rotation therewith;
   an external shaft concentrically journalled on said internal shaft;
   a second sun gear keyed to said external shaft for rotation therewith;
   a planet carrier connected to said driven shaft and rotatable therewith;
   a pair of engaging planet gears journaled in said planet carrier, one of said planet gears engaging said first sun gear and rotated thereby in one direction, and the other of said planet gears engaging said second sun gear and rotating the second sun gear in a direction opposite the direction of rotation of said first sun gear when said planet carrier is held stationary;

a forward drive fluid coupling including a first torus having a plurality of radial vanes connected to said drive shaft for rotation therewith, and a second torus having a plurality of radial vanes keyed to said external shaft for rotation therewith and cooperating with the vanes of said first torus to be driven by said first torus in rotation when the radial vanes of the tori are coupled by a fluid therebetween;

a reverse drive fluid coupling including a first torus having radial vanes keyed to said external shaft for rotation therewith, and a second torus having radial vanes disposed opposite the vanes of the first torus of said reverse drive fluid coupling;

a vaned fluid directing member positioned between the first and second torus of said reverse drive fluid coupling and having spaced, stationary vanes oriented to alow fluid communication between the vanes of the first and second tori of said reverse drive fluid coupling;

a ring gear connected to the radial vanes of said second torus of said reverse drive fluid coupling and rotatable codirectionally therewith, said ring gear meshing with said other planet gear and driven in rotation thereby in the same direction as said first sun gear when said planet carrier is retained stationary; and means for selectively introducing a fluid under pressure to said forward drive and reverse drive fluid couplings to selectively couple the pair of tori in each fluid coupling.

2. The automatic transmission system defined in claim 1 and further characterized to include a variable vane stator device connected to said means for selectively introducing fluid under pressure, and having a plurality of variable pitch vanes cooperating with the vanes of the tori of the forward drive fluid coupling and responsive to the delivery of fluid under pressure from said means to undergo a variation in pitch.

3. The automatic transmission defined in claim 1 wherein said system includes two sets of planet gears, the first set including said one planet gear and two additional planet gears engaging said first sun gear and rotated thereby, and the second set including said other planet gear and two further planet gears, each of the planet gears in said second set engaging one of the planet gears in said first set, and also engaging said second sun gear and said ring gear, said planet gears all being rotatably supported by said planet carrier.

4. The automatic transmission defined in claim 1 wherein the radial vanes of said first torus are connected to said drive shaft by:
   a coupling housing secured to said vanes; and
   a flywheel secured to said drive shaft and secured to said coupling housing.

5. The automatic transmission defined in claim 2 wherein said means for selectively introducing fluid comprises a gear pump having a hollow pump shaft concentrically surrounding said internal and external shafts and spaced therefrom, said pump shaft extending into the interior of said variable vane stator for supplying fluid under pressure thereto.

6. An automatic transmission as defined in claim 1 wherein said internal shaft has a second end journaled in one end of said driven shaft.

7. The automatic transmission defined in claim 1 and further characterized to include means for isolating said forward drive fluid coupling from said reverse drive fluid coupling so that each fluid coupling may be filled with fluid and drained independently of the other.

8. The automatic transmission system defined in claim 2 and further characterized to include means limiting rotation of the vanes of said variable vane stator to rotation in the same direction as the direction of rotation of the radial vanes of the first torus of said forward drive fluid coupling.

References Cited

UNITED STATES PATENTS

| 2,319,706 | 5/1943 | Reit | 74—688 |
| 2,704,468 | 3/1955 | Horton et al. | 74—688 |
| 2,861,474 | 11/1958 | Moore | 74—688 X |
| 2,876,656 | 3/1959 | Herndon | 74—688 X |
| 2,943,516 | 7/1960 | Herndon | 74—688 X |
| 2,957,373 | 10/1960 | Herndon et al. | 74—688 X |

ARTHUR T. McKEON, *Primary Examiner.*